(12) United States Patent
Mohapatra et al.

(10) Patent No.: US 8,320,361 B2
(45) Date of Patent: Nov. 27, 2012

(54) ADVERTISING ALTERNATE PATHS AT BORDER GATEWAY PROTOCOL ROUTE REFLECTORS

(75) Inventors: Pradosh Mohapatra, Fremont, CA (US); Enke Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 857 days.

(21) Appl. No.: 12/380,466

(22) Filed: Feb. 27, 2009

(65) Prior Publication Data

US 2010/0220736 A1    Sep. 2, 2010

(51) Int. Cl.
H04L 12/28    (2006.01)
(52) U.S. Cl. ......................... 370/351; 370/401
(58) Field of Classification Search ............. None
See application file for complete search history.

(56) References Cited

U.S. PATENT DOCUMENTS

| | | | |
|---|---|---|---|
| 2001/0032271 A1* | 10/2001 | Allen | 709/239 |
| 2003/0179700 A1* | 9/2003 | Saleh et al. | 370/216 |
| 2004/0081154 A1 | 4/2004 | Kouvelas et al. | |
| 2006/0083215 A1* | 4/2006 | Uttaro | 370/351 |
| 2006/0104199 A1* | 5/2006 | Katukam et al. | 370/216 |
| 2006/0171316 A1* | 8/2006 | El-Sakkout et al. | 370/235 |
| 2006/0171331 A1* | 8/2006 | Previdi et al. | 370/254 |
| 2007/0097974 A1 | 5/2007 | Ward et al. | |
| 2007/0130355 A1 | 6/2007 | Shah et al. | |
| 2008/0019361 A1* | 1/2008 | Suri | 370/389 |
| 2008/0062986 A1* | 3/2008 | Shand et al. | 370/392 |
| 2008/0307110 A1 | 12/2008 | Wainner et al. | |
| 2008/0320166 A1 | 12/2008 | Filsfils et al. | |

OTHER PUBLICATIONS

B. Dickson, "Enhanced BGP Capabilities for Enhancing Additional Nth-Best Paths", IETF Internet-Draft, draft-disckson-idr-well-ordered-nth-best-01, Jul. 13, 2008.
Y. Rekhter, "A Border Gateway Protocol 4 (BGP-4)", IETF RFC 4271, Jan. 2006.
T. Bates et al, "BGP Route Reflection: An Alternative to Full Mesh Internal BGP (IBGP)", IETF RFC 4456, Apr. 2006.

* cited by examiner

*Primary Examiner* — John Blanton
(74) *Attorney, Agent, or Firm* — Cindy Kaplan

(57) ABSTRACT

In one embodiment, a method includes receiving routing information at an alternate route reflector in a network, identifying at the alternate route reflector, an alternate path different from a primary path selected and advertised at a primary route reflector in the network, and advertising at the alternate route reflector, the alternate path. The primary and alternate paths define paths for a destination and the alternate path is the only path advertised by the alternate route reflector for the destination.

20 Claims, 4 Drawing Sheets

ADVERTISING ALTERNATE PATHS AT BORDER GATEWAY PROTOCOL ROUTE REFLECTORS

BACKGROUND OF THE INVENTION

The present disclosure relates generally to communications networks, and more particularly, to advertising alternate paths at Border Gateway Protocol (BGP) route reflectors.

For routing purposes, a network may be considered to be divided into different autonomous systems wherein each autonomous system (AS) is a group of routers under common administrative control. The routing of packets within an AS is addressed by an intradomain protocol or interior gateway protocol (IGP) operative within that AS. Routing of packets across AS boundaries is controlled by an interdomain routing protocol or Border Gateway Protocol. BGP is used to exchange routing information among network elements in the same or different autonomous system.

The distribution of BGP routing information within an autonomous system typically requires all routers to be fully meshed. In order to establish a full mesh, each BGP speaker is configured with the identities of its neighbors. A router then establishes a communication session and exchanges BGP messages to convey routing information. Establishing a full mesh constitutes a significant routing scalability challenge and an operational problem in terms of configuration management. This has led to the wide-spread use of route reflection, primarily in order to reduce the number of systems which configuration must be modified in order to introduce or remove an internal BGP speaker. Route reflectors have met with great success and have proliferated throughout the Internet.

Although route reflection can help improve routing scalability and ease the burden of configuration management, route reflection implies with it information reduction, which is not always desired. Conventional deployment of route reflectors thus has drawbacks including a lack or decrease of path diversity.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
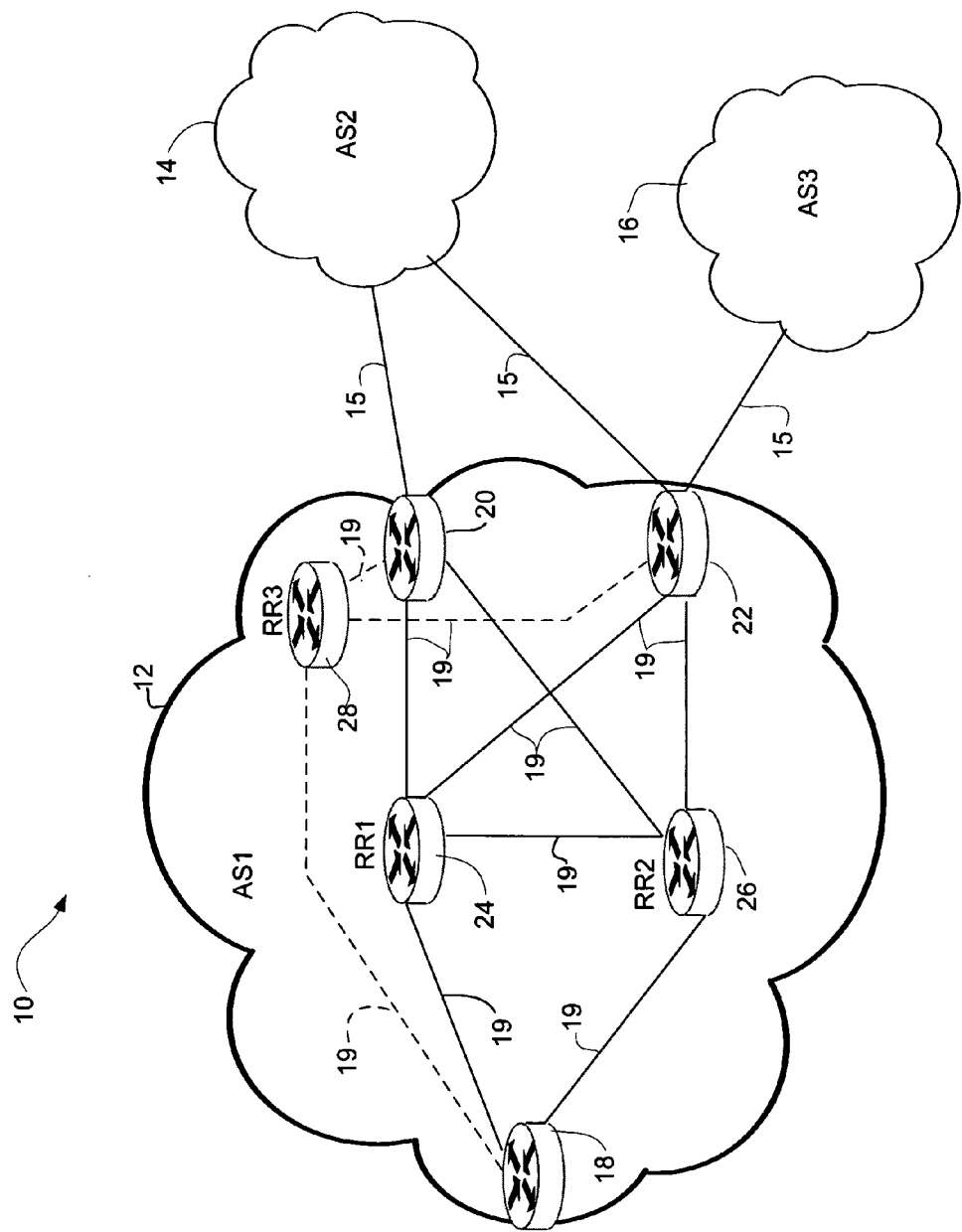
FIG. 1 illustrates a network in which embodiments described herein may be implemented.

In one embodiment, a method generally comprises receiving routing information at an alternate route reflector in a network, identifying at the alternate route reflector, an alternate path different from a primary path advertised at a primary route reflector in the network, and advertising at the alternate route reflector, the alternate path. The primary and alternate paths define paths for a destination in the network and the alternate path is the only path advertised by the alternate route reflector for the destination.

In another embodiment, an apparatus generally comprises a processor configured to receive routing information, identify an alternate path different from a primary path advertised at a primary route reflector, and advertise the alternate path. The primary and alternate paths define paths for a destination and the alternate path is the only path for the destination advertised by the processor. The apparatus further includes memory for storing the routing information and the alternate path.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Border Gateway Protocol (BGP) is a routing protocol used to exchange routing information among network elements in the same or different autonomous system (AS). BGP is structured with the expectation that all BGP peers are connected in a fully-meshed network configuration. Service providers often deploy BGP route reflectors within a single autonomous system to avoid full mesh of BGP speakers. The route reflectors also improve routing scalability.

Route reflectors advertise routing information to their clients. Although route reflection can help ease the burden of configuration management, route reflection reduces information provided to clients, which is not always desired. For example, conventional route reflectors do not allow advertisement of multiple paths to an edge router. Redundant route reflectors, which advertise the same best path information, are often used to provide a backup in case of failure of one of the route reflectors. However, even with the use of conventional redundant route reflectors in the network, network elements are provided no information about alternate exit points from the AS or next-hops for a route. Thus, no additional path diversity is provided.

Embodiments described herein provide path diversity in a network by configuring one or more route reflectors to advertise alternate path information, thereby increasing the number of paths available at BGP speakers. Alternate BGP path information is used for a wide variety of applications in the network, including, fast convergence, avoidance of oscillations, and load balancing of traffic. For example, following a failure along a primary path for a destination, a router within the path cannot switch to a backup path until it receives alternate (e.g., secondary, backup) path information. If information for an alternate path is provided to the router before a failure occurs, the traffic can be switched to the backup path immediately, thus providing faster convergence following a failure. The embodiments described herein provide path diversity while maintaining use of an existing paradigm of advertising only one path. Thus, no changes to existing protocols are required. The only modification is to configure one or more route reflectors that will provide alternate path information.

Referring now to the drawings, and first to FIG. 1, an example of a network 10 that may implement embodiments described herein is shown. For simplification, only a small number of nodes and systems are shown. The system operates in the context of a data communication network including multiple network elements. Some of the elements in a network that employs the system may be network devices such as routers, switches, gateways, or servers. The network device may include, for example, a master central processing unit (CPU), interfaces, and a bus. The CPU preferably includes memory and a processor. The network device may be implemented on a general purpose network machine such as described below with respect to FIG. 2. While a certain number of nodes and links are depicted in the network 10 for purposes of illustration, other networks may include any number or arrangement of nodes.

The network 10 includes a plurality of autonomous systems AS1 (12), AS2 (14), and AS3 (16) interconnected by border routers 20, 22 via communication links 15. For simplification, only the network devices in AS1 are shown. Communication among the routers is typically effected by exchanging discrete data packets or messages in accordance with protocols, such as Transmission Control Protocol/Internet Protocol (TCP/IP), for example. It will be understood by those skilled in the art that the protocols discussed herein are provided as examples and that other protocols may be used without departing from the scope of the invention.

Routing decisions within each AS 12, 14, 16 may rely on an interior gateway protocol (IGP), such as Open Shortest Path First (OSPF) or Intermediate System-to-Intermediate System (ISIS), for example. Routing information may be exchanged among the autonomous systems using an exterior gateway protocol, such as Border Gateway Protocol. The BGP enabled routers (BGP speakers) exchange routing information with other BGP speakers that are not in the same AS using an external form of BGP (eBGP), while the BGP speakers within an AS exchange routing information using an internal form of BGP (iBGP).

A single BGP session involves two BGP nodes and an exchange of routing information. For example, one node will inform the other node that a particular route is available to a particular network or that a previously advertised route is no longer available. A path identifies a destination network address (prefix), a list of autonomous systems traversed by the BGP message containing the path on its way to the BGP listener, and a next-hop address (e.g., an address of a border router within the AS of the BGP listener that may be used to reach the destination network address). The node receiving BGP route updates uses the information to update their own forwarding tables and to propagate the route updates. A node receiving multiple paths to the same destination network will generally pick one or more for its forwarding table and to distribute to other nodes via BGP. In this manner, information about how to route packets across AS boundaries is propagated across the network.

Referring again to FIG. 1, AS1 includes three provider edge routers 18, 20, 22. Each of the routers 18, 20, 22 executes one or more BGP processes and performs the function of an AS border router that exchanges routing information with AS border routers in other autonomous systems. AS1 also includes three route reflectors RR1 (24), RR2 (26), and RR3 (28), which re-advertise, or reflect routes to the provider edge routers 18, 20, 22. Provider edge routers 18, 20, 22 and route reflectors 24, 26, 28 establish BGP peering sessions as described above, among themselves over links 19, which carry conventional BGP messages.

Each route reflector 24, 26, 28 has assigned client routers and re-advertises routes it hears from non-clients to clients and routes it hears from clients to non-clients. The route reflectors 24, 26, 28 receive viable paths from AS border routers 18, 20, 22 (or other route reflectors if multiple levels of reflector hierarchy are used). As described in detail below, one or more of the route reflectors run a BGP best path algorithm to calculate the best path for each destination network and propagate the best path to their clients. One or more other route reflectors run algorithms to determine a secondary path for each destination network and propagate this information to their clients.

It is to be understood that the network shown in FIG. 1 and described herein is only one example and that other networks having different types of network devices, or a different number or arrangement of network devices, may be used without departing from the scope of the invention. For example, AS1 may include only two route reflectors (one for calculating and advertising the best path and another for calculating and advertising the secondary path), more than one alternate route reflector (for advertising different alternate paths), any number of redundant route reflectors, or any combination or hierarchy of route reflectors.

Figure 2:
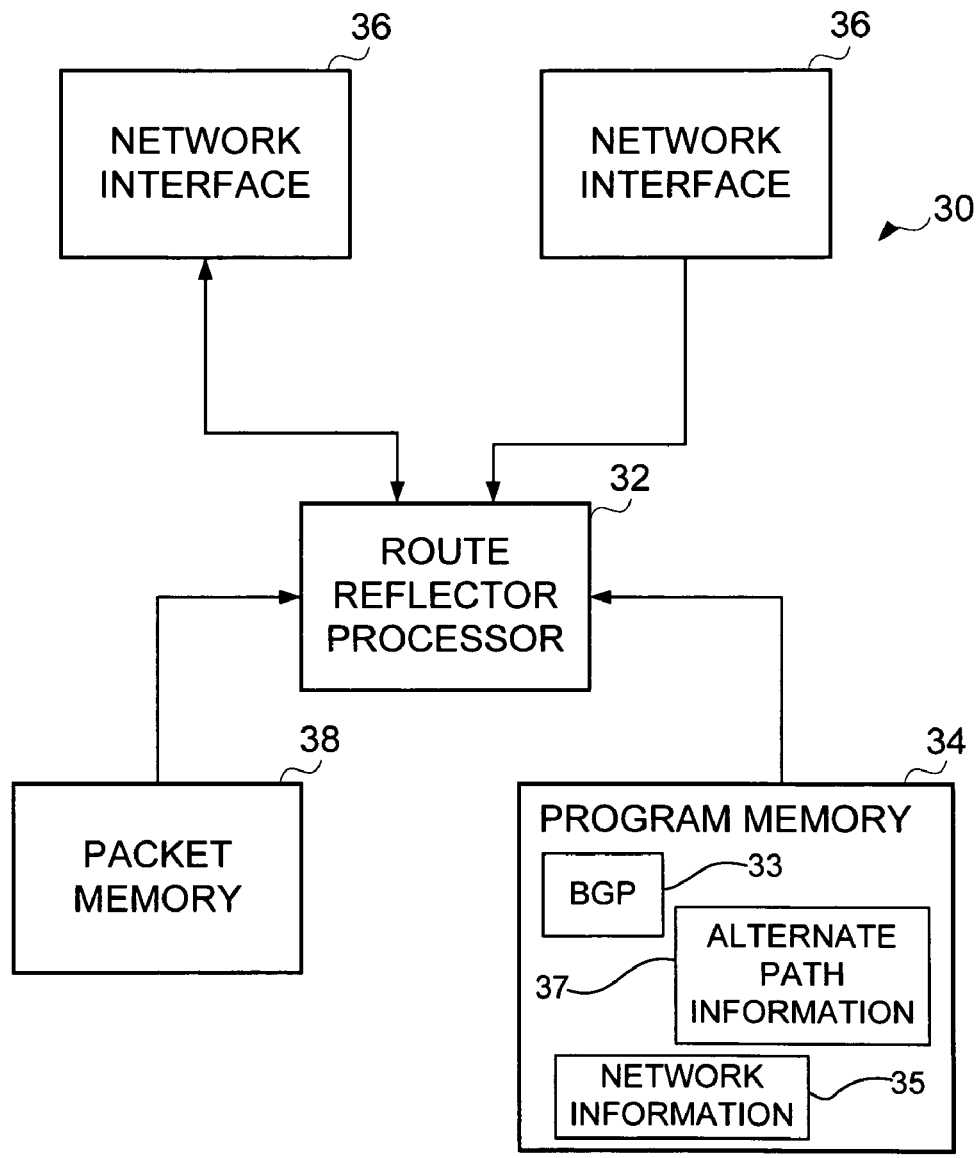
FIG. 2 depicts an example of a network device useful in implementing embodiments described herein.

FIG. 2 depicts a network device 30 that may be used as a route reflector or other network device to implement embodiments described herein. Network device 30 is configured to implement all of the network protocols and extensions thereof described herein. In one embodiment, network device 30 is a programmable machine that may be implemented in hardware, software, or any combination thereof. Logic may be encoded in one or more tangible media for execution by a processor. For example, processor 32 may execute codes stored in a program memory 34. Program memory 34 is one example of a computer-readable medium. Program memory 34 can be a volatile memory. Another form of computer-readable medium storing the same codes is a type of non-volatile storage such as floppy disks, CD-ROMs, DVD-ROMs, hard disks, flash memory, etc.

Software processes for the network device 30 include routing protocol modules such as BGP 33 and IGP (e.g., OSPF, ISIS) (not shown). Data stored in memory may include network (topology) information 35 used in the calculation of best path and alternate paths, and alternate path data 37. Structures for storing the data may include a topology table configured to store a database of the network topology, including nodes and links in the network, a routing information base (RIB) for storing output of shortest path calculations, a routing table that lists all feasible paths to a particular network, or any combination thereof.

Network device 30 interfaces with physical media via a plurality of network interfaces (e.g., linecards) 36. As packets are received, processed, and forwarded by network device 30, they may be stored in a packet memory 38. To implement functionality according to the system, network interfaces 36 may incorporate processing and memory resources similar to those discussed above in connection with the network device as a whole. It is to be understood that the network device 30 shown in FIG. 2 and described above is only one example and that different configurations of network devices may be used.

As discussed above, embodiments described herein extend the route reflector topology by introducing one or more dedicated route reflectors to advertise alternate paths to provider edge nodes. These alternate route reflectors essentially exclude the best path (e.g., primary path) and select an alternate path (e.g., secondary path), which they then advertise to all clients. This increases the availability of paths at the provider edge nodes that can be used for various applications. For example, in fast convergence, the information may be used to program the backup path in forwarding for a fast switchover when the primary path goes away.

The following describes three examples using two or more of the route reflectors (RR1, RR2, RR3) shown in FIG. 1. In each of the examples, the route reflectors, depending on their role, advertise either the best path or an alternate path. In the first example, only conventional route reflectors, which calculate a best path, are used. In the second and third examples, embodiments described herein are used at one or more of the route reflectors to provide alternate path information to their clients.

Referring again to FIG. 1, only two route reflectors (RR1 and RR2) are used in the first example. RR2 operates as a redundant route reflector for RR1. Routers 20 and 22 advertise the same route for a destination within AS2. Assuming the same policy administration is used, both RR1 and RR2 calculate the same best path (e.g., via router 20) and advertise this best path to their clients. Router 18 creates two paths for the route (received from RR1 and RR2), but ultimately both point to the same exit point, provider edge router 20. In the event of a failure at router 20, network convergence does not occur until the route reflectors learn about the failure, recalculate the best path, and re-advertise the routes with router 22 now designated as the exit point from AS1, and router 18 repopulates its forwarding table to point to router 22. This can take up to several seconds or minutes depending on the number of routes in the network.

In the second and third examples below, one of the route reflectors (e.g., RR2 in example 2 and RR3 in example 3) are configured to advertise secondary path information to its client, thereby increasing path diversity.

In the second example, only two route reflectors (RR1 and RR2) are used. RR1 is configured the same as in the first example and advertises only best path information. RR2 is configured to calculate and advertise secondary path information. The secondary path is the best path among remaining paths excluding the best path. The advertisements do not affect routers 20 and 22 since they select their own external paths as the best path. As a result, all the routers have both primary (best) and secondary path information available to them. Router 18 receives information identifying a best path with an exit point at router 20 and a secondary (alternate) path with an exit point at router 22. In the event of a failure at router 20, network convergence can take place very quickly since router 18 already knows about the secondary path to router 22 and immediately, upon learning about the failure in the primary path, installs the secondary path in its forwarding table and switches traffic to the secondary path.

In the third example, RR1 and RR2 operate as primary route reflectors and both advertise the best path via router 20. RR3 is configured to select and advertise the secondary path through router 22. Addition of a third route reflector dedicated for advertising the secondary path is beneficial since service providers (SPs) would like to protect their primary route reflectors, so that if a primary route reflector fails, the redundant route reflector is able to take over. Also, in the event that the primary route reflector fails and does not come back up within a Graceful Restart (GR) time period, the backup route reflector will take over as the primary route reflector.

The embodiments described herein can also be extended to a topology in which there is more than one alternate path route reflector. For example, the three route reflectors (RR1, RR2, RR3) of FIG. 1 may be configured such that RR1 selects and advertises a primary path, RR2 selects and advertises a secondary path, and RR3 selects and advertises a tertiary path. Thus, the embodiments described herein can be generalized to 'n' number of alternate route reflectors. Each such alternate route reflector computes and advertises a different alternate path, therefore, significantly increasing the path diversity in the network.

Figure 3:
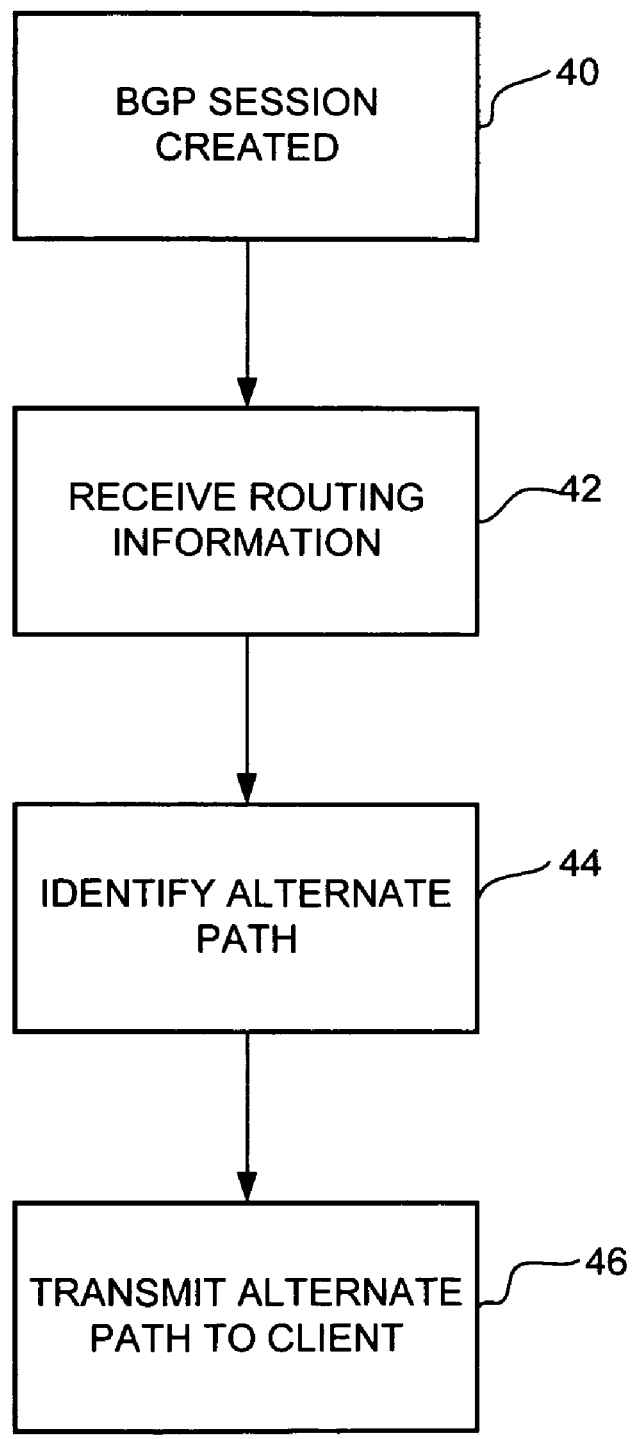
FIG. 3 is a flowchart illustrating a process for advertising an alternate path in the network of FIG. 1, in accordance with one embodiment.

FIG. 3 is a flowchart illustrating a process for advertising alternate paths in a communications network, in accordance with one embodiment. A BGP session is created between an alternate route reflector configured to select and advertise an alternate path (e.g., RR3 in FIG. 1) and its client (router 18) (step 40). The alternate path is different from a primary path advertised by a primary route reflector (e.g., RR1) in the AS. The primary and alternate paths define paths for a destination (e.g., network AS2 or node within network AS2). The alternate route reflector receives routing information (e.g., network, topology, route information) at step 42. The information may be received from BGP advertisements or other protocol messages. The route reflector identifies an alternate path (step 44) and transmits the alternate path information to its client (step 46). The alternate path is the only path advertised by the alternate route reflector for the destination (i.e., primary path or other alternate paths to the destination are not advertised by the alternate route reflector). As described above, the alternate path may be a secondary path or any other backup path that is different from the primary (best) path advertised by other route reflectors in the network.

Figure 4:
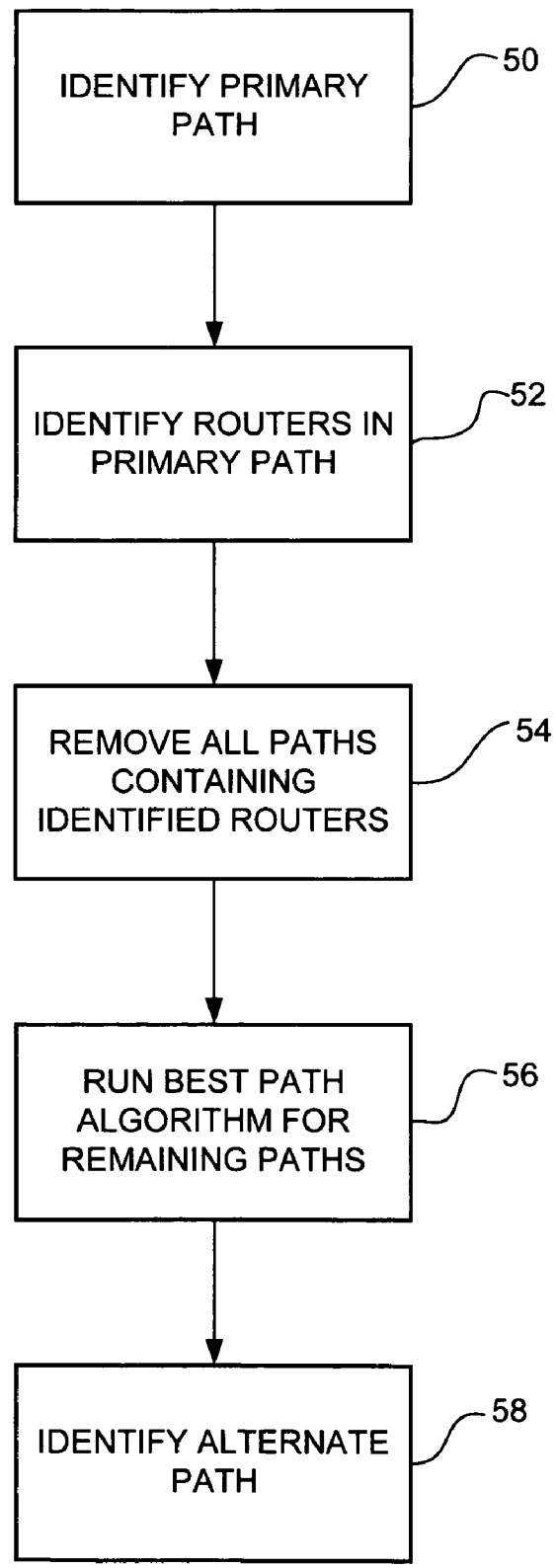
FIG. 4 is a flowchart illustrating a process for identifying the alternate path.

FIG. 4 is a flowchart illustrating a process for identifying an alternate path, in accordance with one embodiment. Computation of the alternate path may depend on the application for which the alternate path will be used. For example, for fast convergence, the alternate path may be computed as the most disjoint path from the best path (e.g., one that has a different next-hop, most disjoint path, etc.). For the purposes of calculating a disjoint path, a path is chosen containing one or more routers that are not within the best path. The alternate route reflector first identifies the primary (best) path (step 50). The route reflector then identifies the routers in the primary path (step 52) and removes all paths containing the identified routers from a group of possible paths (step 54). For example, the alternate route reflector may fetch the router-IDs for all routers in the primary path and remove all paths containing the identified router-IDs. The route reflector then runs a best path algorithm for the remaining paths (step 56) and selects an alternate path (step 58). As previously described, the alternate route reflector may be configured to select alternate paths other than the secondary path. In this case, the route reflector would remove all paths containing routers within the primary path, secondary path, etc., and run the best path algorithm with the remaining paths.

It is to be understood that one or more of the steps shown in the flowcharts of FIGS. 3 and 4 may be removed, new steps may be added, or the steps may be performed in a different order or in parallel, without departing from the scope of the invention.

The route reflectors are preferably manually configured as primary (best path) route reflectors or alternate (e.g., secondary or tertiary path) route reflectors. In an alternate embodiment, the route reflectors decide among themselves which route reflector(s) will select and advertise the best path and which route reflector(s) will select and advertise alternate paths. For example, the route reflectors may advertise their BGP router-IDs, cluster-ID, and a flag indicating that they are operating as a BGP route reflector in the IGP LSPs. Since the IGP information is flooded throughout the network, all the route reflectors will come to know about the other route reflectors in a cluster. The route reflectors can then elect a primary route reflector (or set of primary route reflectors) in a distributed manner by electing, for example, the highest router-ID. Similar logic can be extended to elect the alternate route reflectors.

The embodiments described herein can also be used to advertise the best external path from the border router. For example, when the border router advertises its best external path, even when the path is not the best path (an iBGP path is chosen as the best path), the alternate route reflector can advertise this path as the secondary path.

As can be observed from the foregoing, the embodiments described herein provide numerous advantages. For example, the embodiments described herein provide alternate BGP paths in the network which may be used for a variety of applications including providing fast convergence following a network failure. Furthermore, the embodiments require no extensions or modifications to currently implemented protocols.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
receiving routing information at an alternate route reflector in a network;
identifying at the alternate route reflector, an alternate path different from a primary path advertised at a primary route reflector in the network, wherein said primary path defines a best path for a destination in the network and said alternate path defines a secondary path for the destination; and
advertising at the alternate route reflector, said alternate path in the network, wherein said alternate path is the only path advertised by the alternate route reflector for the destination;
wherein identifying said alternate path comprises identifying said primary path and nodes within said primary path and calculating said alternate path from a group of paths for the destination selected based on said nodes in said primary path.

2. The method of claim 1 wherein the primary and alternate route reflectors are Border Gateway Protocol (BGP) route reflectors.

3. The method of claim 1 wherein identifying said alternate path further comprises removing all paths containing said identified nodes from said group of paths for the destination, and calculating said alternate path from a group of remaining paths for the destination.

4. The method of claim 3 wherein calculating said alternate path comprises running a best path algorithm using said group of remaining paths.

5. The method of claim 1 wherein identifying said alternate path further comprises identifying a secondary path, identifying nodes within said secondary path, removing all paths containing said identified nodes from said group of paths for the destination, and calculating said alternate path from a group of remaining paths for the destination.

6. The method of claim 1 wherein the destination is a border router in communication with an autonomous system.

7. The method of claim 1 wherein the destination is a node in the same autonomous system as the primary route reflector and the alternate route reflector.

8. The method of claim 1 wherein the primary route reflector comprises at least two primary route reflectors, one of the primary route reflectors configured as a redundant route reflector.

9. The method of claim 1 wherein said alternate path comprises a destination network address and a next-hop address.

10. The method of claim 1 wherein said alternate path is advertised to a client associated with the alternate route reflector.

11. An apparatus comprising:
a processor configured to receive routing information, identify an alternate path different from a primary path advertised at a primary route reflector in the network, and advertise said alternate path, wherein said primary path defines a best path for a destination in the network and said alternate path defines a secondary path for the destination and said alternate path is the only path advertised by the processor for the destination; and
memory for storing said routing information and said alternate path;
wherein identifying said alternate path comprises identifying said primary path and nodes within said primary path and calculating said alternate path from a group of paths for the destination selected based on said nodes in said primary path.

12. The apparatus of claim 11 wherein the apparatus is a Border Gateway Protocol (BGP) route reflector.

13. The apparatus of claim 11 wherein identifying said alternate path at the processor further comprises removing all paths containing said identified nodes from said group of paths for the destination, and calculating said alternate path from a group of remaining paths for the destination.

14. The apparatus of claim 13 wherein the processor is configured to run a best path algorithm using said group of remaining paths.

15. The apparatus of claim 11 wherein identifying said alternate path at the processor further comprises identifying nodes within said secondary path, removing all paths containing said identified nodes from said group of paths for the destination, and calculating said alternate path from a group of remaining paths for the destination.

16. The apparatus of claim 11 wherein the destination is a border router in communication with an autonomous system.

17. The apparatus of claim 11 wherein the destination is a node in the same autonomous system as the primary route reflector and the alternate route reflector.

18. The apparatus of claim 11 wherein said alternate path comprises a destination network address and a next-hop address.

19. Logic encoded on one or more tangible computer readable media for execution and when executed operable to:
identify at an alternate route reflector, an alternate path different from a primary path selected and advertised at a primary route reflector in the network, based on routing information received at the alternate router reflector, wherein said primary path defines a best path for a destination in the network and said alternate path defines a secondary path for the destination; and
advertise at the alternate route reflector, said alternate path in the network, wherein said alternate path is the only path advertised by the alternate route reflector for the destination;
wherein identifying said alternate path comprises identifying said primary path and nodes within said primary path and calculating said alternate path from a group of paths for the destination selected based on said nodes in said primary path.

20. The logic of claim 19 wherein the primary and alternate route reflectors are Border Gateway Protocol (BGP) route reflectors.

* * * * *